United States Patent
Jeran et al.

(10) Patent No.: US 9,348,544 B2
(45) Date of Patent: May 24, 2016

(54) PRINTER

(75) Inventors: Paul L. Jeran, Boise, ID (US); Sean D. Fitzgerald, Boise, ID (US); Mark Q. Shaw, Boise, ID (US); Robin P. Yerenson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/234,888

(22) PCT Filed: Jul. 29, 2011

(86) PCT No.: PCT/US2011/045940
§ 371 (c)(1),
(2), (4) Date: Jan. 24, 2014

(87) PCT Pub. No.: WO2013/019186
PCT Pub. Date: Feb. 7, 2013

(65) Prior Publication Data
US 2014/0160519 A1    Jun. 12, 2014

(51) Int. Cl.
*G06K 15/00* (2006.01)
*G06F 3/12* (2006.01)
*B41J 2/175* (2006.01)
*G06Q 30/06* (2012.01)

(52) U.S. Cl.
CPC ........... *G06F 3/1239* (2013.01); *B41J 2/17546* (2013.01); *G06F 3/1203* (2013.01); *G06F 3/1219* (2013.01); *G06F 3/1279* (2013.01); *G06F 3/1235* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 4,564,792 A | 1/1986 | Fukushi | |
| 5,531,435 A | 7/1996 | Momose | |
| 5,809,143 A * | 9/1998 | Hughes | 705/77 |
| 6,820,064 B1 | 11/2004 | Currans et al. | |
| 6,876,986 B1 | 4/2005 | Currans et al. | |
| 7,353,275 B2 * | 4/2008 | Li et al. | 709/225 |
| 2001/0039625 A1* | 11/2001 | Ananda | 713/202 |
| 2003/0063914 A1* | 4/2003 | Masuda et al. | 399/12 |
| 2003/0065713 A1* | 4/2003 | Quach et al. | 709/203 |
| 2005/0030554 A1* | 2/2005 | Dixon et al. | 358/1.1 |
| 2007/0091348 A1 | 4/2007 | Asaka | |
| 2007/0092267 A1* | 4/2007 | Yonenaga | 399/8 |
| 2008/0100860 A1 | 5/2008 | Yamada | |
| 2008/0259142 A1* | 10/2008 | Therien et al. | 347/86 |
| 2008/0273883 A1* | 11/2008 | Kim | B41J 2/17546 399/12 |
| 2009/0174733 A1 | 7/2009 | Balcan | |
| 2009/0201330 A1* | 8/2009 | Azami | G03G 15/5062 347/15 |
| 2010/0268591 A1* | 10/2010 | Gnanasambandam et al. | 705/14.37 |
| 2010/0332653 A1* | 12/2010 | Mizuno | G06F 3/1203 709/224 |
| 2011/0102865 A1 | 5/2011 | Ishida et al. | |
| 2011/0254907 A1* | 10/2011 | Jeon | B41J 2/17546 347/86 |

FOREIGN PATENT DOCUMENTS

| | | |
|---|---|---|
| EP | 2343639 | 7/2011 |
| JP | 9030669 | 2/1997 |
| JP | 2005/059453 | 3/2005 |
| WO | WO-2011116077 | 9/2011 |

OTHER PUBLICATIONS

Supplementary European Serach Report for Application No. EP11870450.1. Report issued Dec. 8, 2014.

* cited by examiner

*Primary Examiner* — John Wallace
(74) *Attorney, Agent, or Firm* — HP Inc. Patent Department

(57) ABSTRACT

In one example a media authorization code may be authenticated in a printer to authorize the colorant supply to print when a counter does not exceed a predetermined amount of authorized media units.

15 Claims, 16 Drawing Sheets

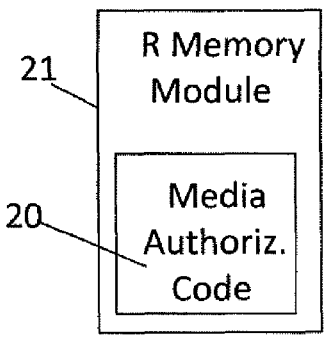
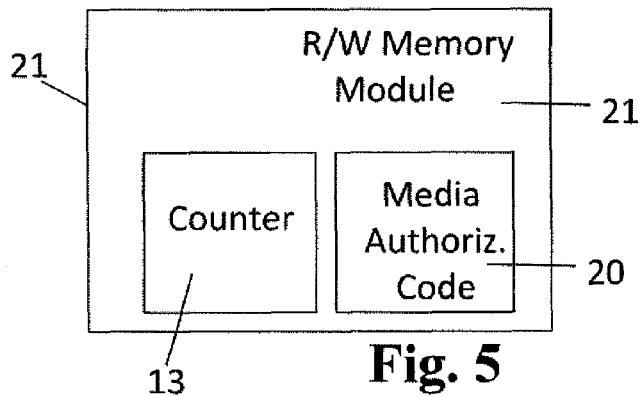
Fig. 4   Fig. 5
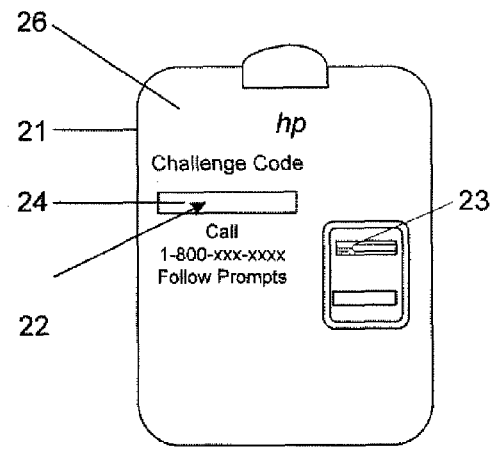
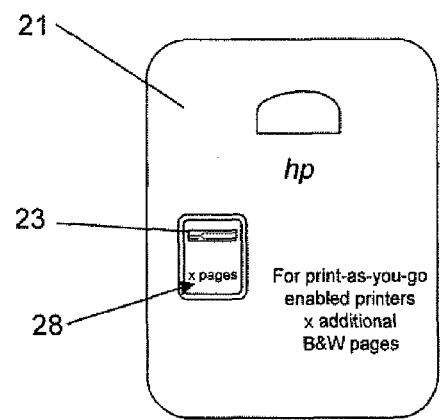
Fig. 6   Fig. 7
| | 27A | 27B | 27C |
|---|---|---|---|
| Auth Code A | ID11 | ID12 | ID1n |
| Auth Code B | ID21 | ... | ... |
| Auth Code C | ... | ... | ... |
| Auth Code D | ... | ... | IDnn |
28A → Auth Code A
28B → Auth Code B
28C → Auth Code C
28D → Auth Code D
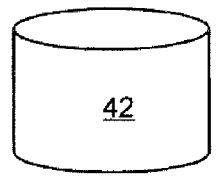
Fig. 8A   Fig. 8

PRINTER

BACKGROUND

Printers are provided with a colorant supply for transferring colorant onto media. Printers include printer circuitry to process image data and to drive the image supply to transfer the colorants to the media. In some examples, consumers can buy consumables in the form of colorant supplies and/or batches or units of media to facilitate the printing process.

BRIEF DESCRIPTION OF THE DRAWINGS

For the purpose of illustration, certain examples of the present invention will now be described with reference to the accompanying drawings, in which:

FIG. 4 shows a diagram of an example of a memory module;
FIG. 5 shows a diagram of another example of a memory module;
FIG. 6 shows an example of one side of a memory module;
FIG. 7 shows an example of another side of the memory module of FIG. 6;
FIG. 8 shows an example of data on an authentication server or other external device;
FIG. 8A shows a diagram of an example of an authentication server.

DETAILED DESCRIPTION

In the following detailed description, reference is made to the accompanying drawings. The examples in the description and drawings should be considered illustrative and are not to be considered as limiting to the specific example or element described. Multiple examples may be derived from the following description and/or drawings through modification, combination or variation of certain elements. Furthermore, it may be understood that also examples or elements that are not literally disclosed may be derived from the description and drawings by a person skilled in the art.

Figure 1:
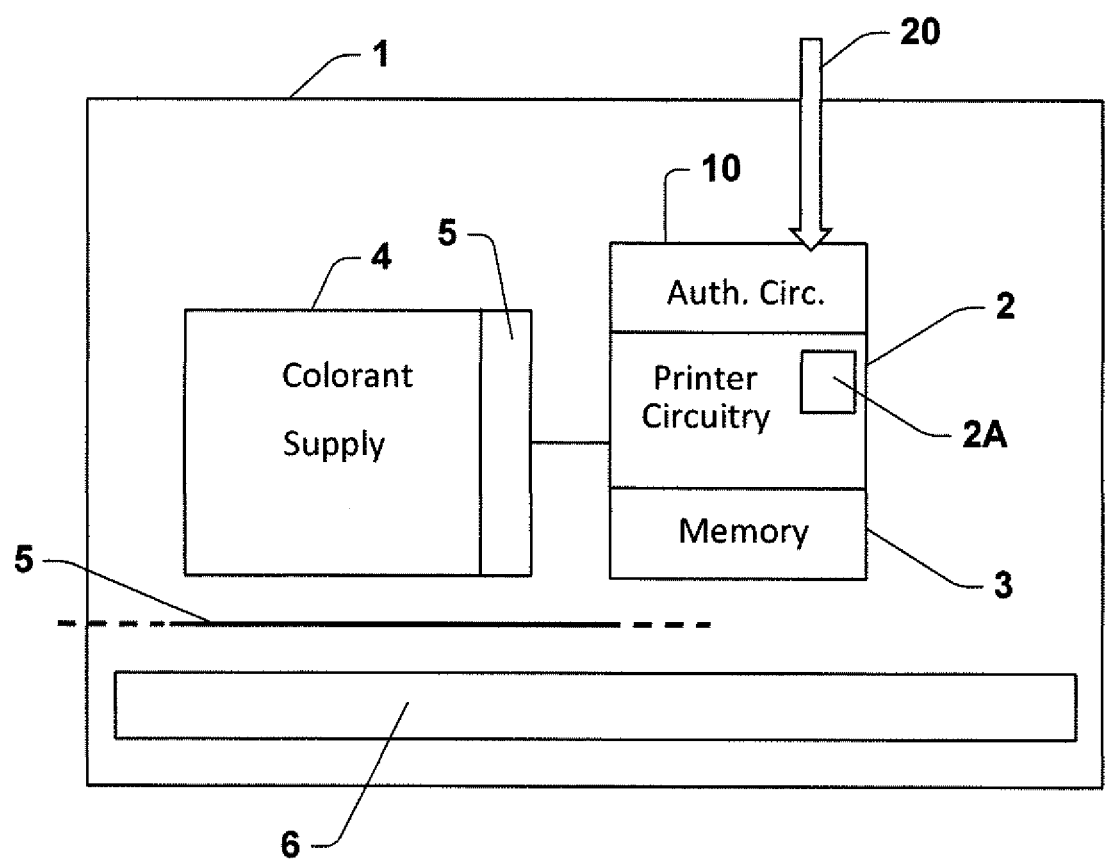
FIG. 1 shows a diagram of an example of a printer.

FIG. 1 shows a diagram of an example of a printer 1. For example, the printer 1 includes at least one of an electrophotographic printer, an inkjet printer, a multifunctional printer, a copy machine, etc. The printer 1 includes printer circuitry 2. The printer circuitry 2 includes a processing circuit 2A and an internal printer memory 3. The printer 1 includes a colorant supply 4, arranged to transfer colorant to media units 5 placed in the printer 1. In the shown example, a stack 6 of media units 5 is placed in the printer 1. The printer 1 includes a drive system 7 for example for driving the colorant supply 4 and/or the media 5. The drive system 7 may include a media advance system. In different examples, the drive system 7 may be configured to drive a pump, engine or electromotor. The printer circuitry 2 may be configured to instruct the colorant supply 4 and the drive system 7.

In this description, media units 5 may for example refer to pages, sheets, and/or certain substrates for colorants. For example, the "units" may refer to separate pieces of media or lengths, surfaces, and/or weights of media.

The colorant supply 4 may include dry or wet toner, ink, fluid, pigments, dyes, and/or any colorant of any suitable material or color, for example including cyan, magenta, yellow, black, white and/or grey. In an example, the colorant supply 4 includes a reservoir for holding the colorant. In an example, the colorant supply 4 includes a transfer mechanism for transferring the colorant to the media 5, for example a circuit for driving fluid ejection such as piezo or heat resistors, driving a photographic discharge system and/or another suitable transfer mechanism. For example the drive system 7 may be at least partly included in the colorant supply 4. The colorant supply 4 may be an integral part of the printer 1, arranged as a non-removable part of the printer 1, adapted to be assembled or disassembled by a manufacturer, reseller or skilled person only. In another example, the colorant supply 4 is replaceable by an end user.

In an example, the printer 1 includes a first authentication circuit 10 for secure authentication. The first authentication circuit 10 may be configured to authenticate a media authorization code 20 entered into the printer 1. Upon authentication, the printer 1 is unlocked for printing from an end user perspective. For example, the first authentication circuit 10 is configured to signal the printer circuitry to authorize printing of media units 5. For example, the first authentication circuit 10 is configured to verify if an incoming media authorization code 20 and a printer 1 correspond. The printer circuitry 2 is configured to authorize an authorized amount of media units 5 for printing upon entry and authentication of the media authorization code 20. For example, the first authentication circuit 10 is configured to authenticate using encryption and/or digital signing techniques.

Figure 2:
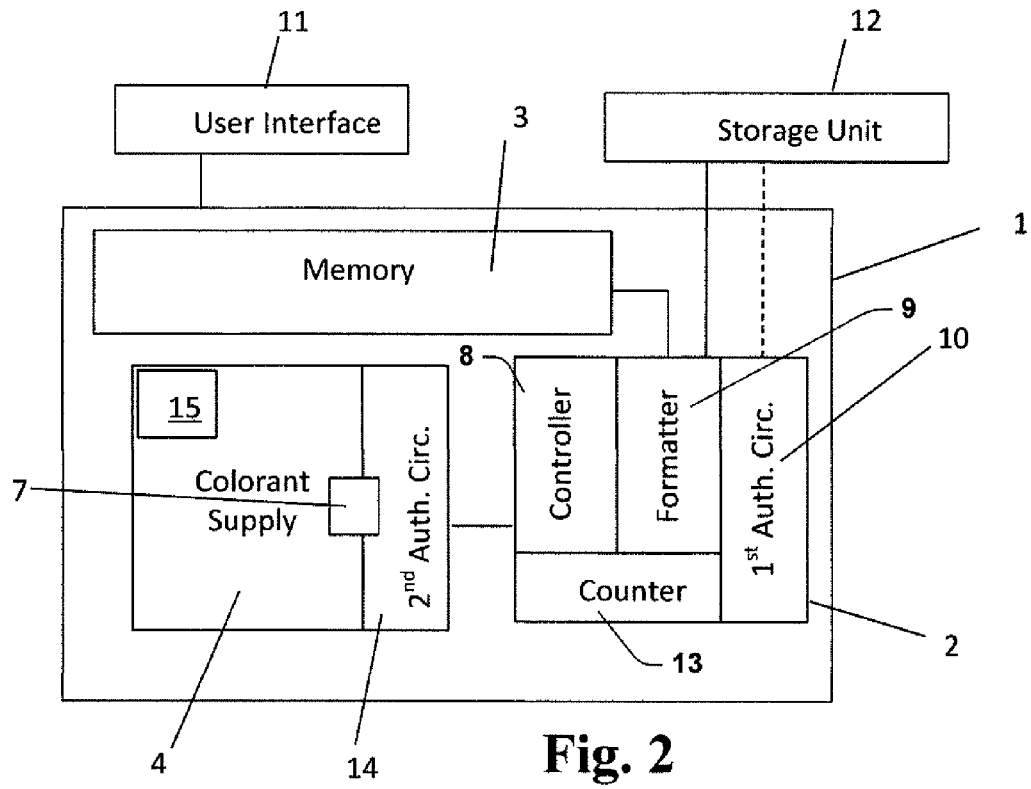
FIG. 2 shows a diagram of another example of a printer.

FIG. 2 shows another example of a printer 1. The printer circuitry 2 includes a printer controller 8 and a formatter 9. The controller 8 is configured to instruct the colorant supply 4 to transfer the colorant according to processed digital images. For example, the controller 8 is configured to instruct the drive system 7. For example the controller 8 includes an application specific integrated circuit (ASIC), for example a digital and an analogue ASIC for processing incoming signals, for example of the formatter 9, and driving the colorant supply 4. The formatter 9 may be configured to process digital images and instruct the controller 8 according to the processed digital images. The digital images may be provided through a physical and/or wireless data interface, for example through a local or wide area network and/or by a hard or flash disk drive. Physical and/or wireless data interfaces may include any standard or specially designed physical or wireless digital device interface, internet, Bluetooth, mobile communication networks, electromagnetic or radio signals, satellite connection, USB, etc.

The printer 1 may include a user interface 11. The user interface 11 may include a display and/or operator panel for communicating and/or receiving information. The user interface 11 may be a portion of the printer 1 or of a data network connected device such as a portable or desktop computer device, including a phone. The user interface 11 may be driven through firmware and/or software installed in the respective device. For example, the user interface 11 may be embodied by a virtual or physical operator panel and is configured to allow a user to instruct the printer 1, or an externally connected device 12. The printer 1 may be connectable to one or more data communication networks, physically or wirelessly, to an external device 12 such as a mobile memory module, an integrated circuit, server and/or database. The external device 12 may include a processing unit and a memory and may be arranged for data exchange.

The printer circuitry 2 may be configured to instruct a counter 13 to count printed media units 5. In an example the printer circuitry 2 includes the counter 13. In another example, an external device 12 includes the counter 13. The counter 13 is configured to count printed media units 5. The counter 13 may be configured to either deduct credits from a predetermined amount of authorized media units 5, or add credits until the summed amount of credits reaches a predetermined amount of authorized media units 5. The printer circuitry 2 is configured to instruct printing actions while the counter count does not reach the threshold corresponding to the predetermined amount of media units 5, which may for example be zero if the counter 13 deducts counts, or for example 500, 1000, 2000, or 1000 if the counter 13 adds up. In an example, the amount of authorized media units 5 is temporarily stored in the internal memory 3 of the printer 1, wherein the count stored on the internal memory 3 is adjusted after printing.

In an example, the printer 1 includes a lifetime colorant supply 4. For example, the colorant supply 4 is locked in the printer 1 so as to be non-exchangeable and non-refillable from an end user perspective, so that when the printer 1 runs out of colorant, the end user needs to be change printer 1 to be able to print further media units 5. For example, the printer 1 may be provided with a colorant reservoir mechanically integrated with or locked in the printer 1. For example, the colorant supply 4 can only be refilled and/or exchanged with special tools and/or information owned by manufacturers. Examples of measurements of integrating/locking the colorant supply 4 are connecting the colorant reservoir by glue or permanent coupling materials, or special screws that require specially designed tools to connect or disconnect the colorant supply 4 other printer components.

For example, the colorant supply 4 is digitally locked to the printer 1. For example, the printer circuitry 2 is configured to authenticate the colorant supply 4. For example, before the printer 1 is registered to or procured by an end user, the printer circuitry 2 may be configured so as to match an originally installed colorant supply 4 and/or an originally installed colorant. For example, the printer circuitry 2 is configured to authenticate the colorant supply 4. For example, the printer circuitry 2 is configured to inhibit printing if the installed colorant supply 4 does not match the originally configured colorant supply 4. For example, the printer 1 includes a second authentication circuit 14 configured to verify if the printer 1 and colorant supply 4 correspond. In an example, the printer circuitry 2 includes the second authentication circuit 14. In an example, the second authentication circuit 14 is physically attached to the colorant supply 4. In a further example, the second authentication circuit 14 is provided by a separate integrated circuit attached to the colorant supply 4, such as a microcontroller. For example, the printer circuitry 2 is configured to authenticate the second authentication circuit 14, for authenticating the colorant supply 4.

In an example, at least one of the printer circuit 2 and/or the second authentication circuit 14 is connected to a colorant level sensing circuit 15. In again a further example, a colorant level as signaled by the colorant level sensing circuit 15 is stored in at least one of the printer circuitry 2 and the second authentication circuit 14. In yet another example, the second authentication circuit 14 and/or the printer circuitry 2 are configured to authenticate the colorant supply 4 by verifying if a colorant level approximately matches an expected colorant level. For example, the authentication circuit 14 and/or the printer circuitry 2 are configured to verify if a colorant level has not increased. Colorant levels may be stored in an internal memory 3 and verified.

Figure 3:
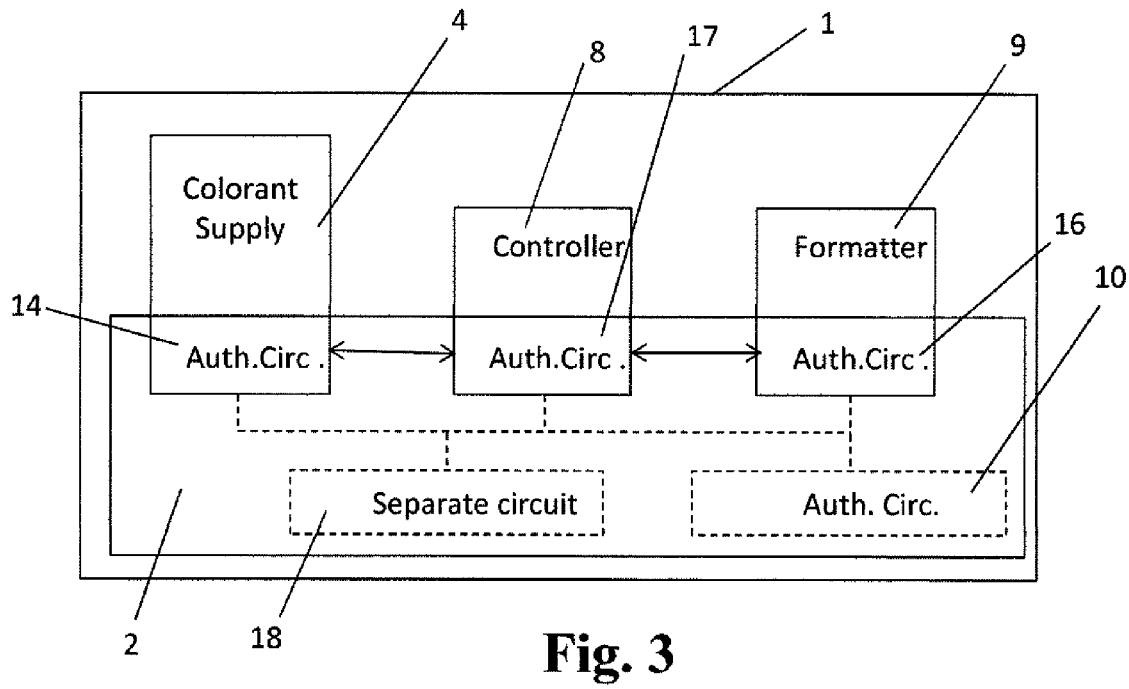
FIG. 3 shows a diagram of another example of a printer.

FIG. 3 shows an example of a printer 1 comprising different authentication circuits 10, 14, 16, 17 for authenticating different components 4, 8, 9 in the printer 1. In an example, the printer circuitry 2 includes a third authentication circuit 16 configured for verifying if the formatter 9 and printer 1 correspond. For example, the printer circuitry 2 or a separate circuit 18 is configured to authenticate the third authentication circuit 16. The third authentication circuit 16 may include a formatter authorization code. The printer circuitry 2 may be configured to securely verify if the formatter authorization code corresponds to a previously stored formatter authorization code that corresponds to the formatter 9 as originally installed and configured. The printer circuitry 2 may be configured so that if the formatter authorization code is not authenticated then the formatter 9 is not authenticated and further printing is not authorized. In a further example, the printer circuitry 2 includes a fourth authentication circuit 17 configured for verifying if the controller 8 and printer 1 correspond. For example, the printer circuitry 2 or a separate circuit 18 is configured to authenticate the fourth authentication circuit 17. The fourth authentication circuit 17 may include a controller authorization code. The printer circuitry 2 may be configured to securely verify if the controller authorization code corresponds to a stored controller authorization code that corresponds to the controller 8 as originally installed and configured. The printer circuitry 2 may be configured so that if the controller authorization code is not authenticated then the controller 8 is not authenticated and further printing is not authorized. In different examples, a separate authentication circuit 18 may be configured to authenticate said components 8, 9, 4, or a separately configured portion of the formatter 9 and/or the first authentication circuit 10 and/or the controller 8 may be configured to authenticate said components 8, 9, 4, for example as explained above. For example, the authentication circuits 10, 14, 16, 17 may include integrated circuits, such as smart chips, and/or secure chips and/or secure micro-controllers.

In an example the authentication circuit 10, 14, 16, 17 is used in a lifetime supply printer 1. In an example at least two authentication circuits 10, 14, 16, 17, corresponding to a respective print component 2, 4, 9, 8, may be configured to receive and authenticate the media authorization code 20. In again a further example, one or more of the authentication circuits 10, 14, 16, 17 include the counter 13.

FIGS. 4-8 show diagrammatic examples of external devices 8 that store a media authorization code 20. FIG. 4 shows an example wherein the external device 12 is a memory module 21. For example, the memory module 21 is connectable to the printer 1. For example, the memory module 21 includes a read only memory. For example, the read only memory stores a media authorization code. For example, the read only memory stores a predetermined amount of authorized media units 5.

FIG. 5 shows another example of a memory module 21 connectable to the printer 1. The memory module 21 of FIG. 5 may include a read/write memory, for example an integrated circuit, for example a secure micro controller. The memory module 21 stores a media authorization code 20 in a digitally secured manner. For example, the media authorization code 20 is encrypted and/or digitally signed. For example, the read only memory stores a predetermined amount of authorized media units 5. For example, the integrated circuit may include the counter 13. For example, the counter 13 indicates a remaining authorized amount of media units.

FIGS. 6 and 7 shows examples of respective faces of another example memory module 21. For example, the example memory module 21 includes a card 26 made of plastic or card board or the like, and may be referred to as "smart card". The memory module 21 includes an integrated circuit 23, for example a microcontroller. For example, the integrated circuit 23 includes the media authorization code, for example in encrypted form. The memory module 21 may be arranged to be connected to the printer 1 for transmitting data such as the media authorization code 20 and instructions relating to the counter 13. For example, the memory module 21 includes a challenge code 22 which is a human readable code. The challenge code 22 may be human readably written on the card 26. For example, before usage a cover 24 is provided to visibly hide the challenge code. For example, the cover 24 comprises a material that is arranged to be scratched or pulled off to uncover the challenge code 22. In an example scenario, the challenge code 22 is provided so as to be communicated through the user interface 11 of the printer 1, or through a connected device or a phone, for example in digitally and/or orally. For example, a communication address 25 such as a phone number or website may be indicated on the card 26. The challenge code 22 may be communicated by the user through a phone or digital data communication network, so that the user may receive a second authorization code in return. For example, the second authorization code may be generated and/or provided through an authentication server or operator. The second authorization code may be entered into the printer 1 through the user interface 11, in addition to the media authorization code 20, for authenticating the amount of authorized media units 5. In an example, the amount of authorized media units 5 on a memory module 1 is indicated on the memory module 21, for example on a location 28.

FIG. 8 shows an example of data on an external device 12, such as for example an authentication server 42 (see FIG. 8A). For example, the data may be stored in a LUT or generated on request. For example, the data may be generated using cryptography including symmetric and/or asymmetric signing. For example, the authentication server 42 includes multiple authorization codes 28A-28D. The authorization codes 28A-28D may include media authorization codes 20 and/or second authorization codes and/or other authorization codes. For example, the authorization codes 28A-28D are assigned to predetermined printers 1, and/or predetermined users, and/or predetermined memory modules 21. For example, IDs 27A-C that correspond to each of the printers 1, a group of printers 1, customers, resellers, users and/or memory modules 21 may be registered in the authentication server, so that each authorization code 28A-28D may have at least one assigned ID 27A-27D, or each ID 27A-27D may have at least one assigned authorization code 28A-28D. In certain examples, the ID 27A-27D may correspond to a biometric code, for example as captured with the aid of a camera and/or pattern recognition software, or the ID 27A-27D may correspond to another code, for example as read from an identity card. The ID 27A-27D may also correspond to the challenge code 22. The authentication server 42 may be configured to communicate an authorization code 28A-28D upon receiving a respective ID 27A-27D. For example, an authorization code 28A-28D may be retrieved by a third party or printer 1 to authorize the printer 1 for printing pages, by communicating the ID 27A-27D to the authentication server 42. Also, the authentication server 42 may serve to verify if an ID 27A-27D and a media authorization code are authentic, for example when receiving a data package from the printer 1 that comprises both the media authorization code and the respective ID 27A-27D. For example, verifying an authenticity may include verifying the authenticity of the respective ID 27A-27D and verifying the authenticity of the media authorization code, and matching the media authorization code and the ID 27A-27D. In a further example, authentication includes using asymmetric encryption/decryption techniques and/or digitally signing the data. For example, if a printer ID and/or a memory module ID and a media authorization code 20 are sent to the authentication server 42, and the authentication server determines that the respective ID and authorization code are not authentic, the authentication server may signal the printer 1 to discontinue an authentication process. In a further example, if the authentication server 42 determines that the respective ID and authorization code are authentic, the authentication server 42 may signal the printer 1 to authenticate the media authorization code 20. In an example, the signal from the authentication server to the printer 1 may be authenticated by the printer 1 in a similar manner.

Figure 9:
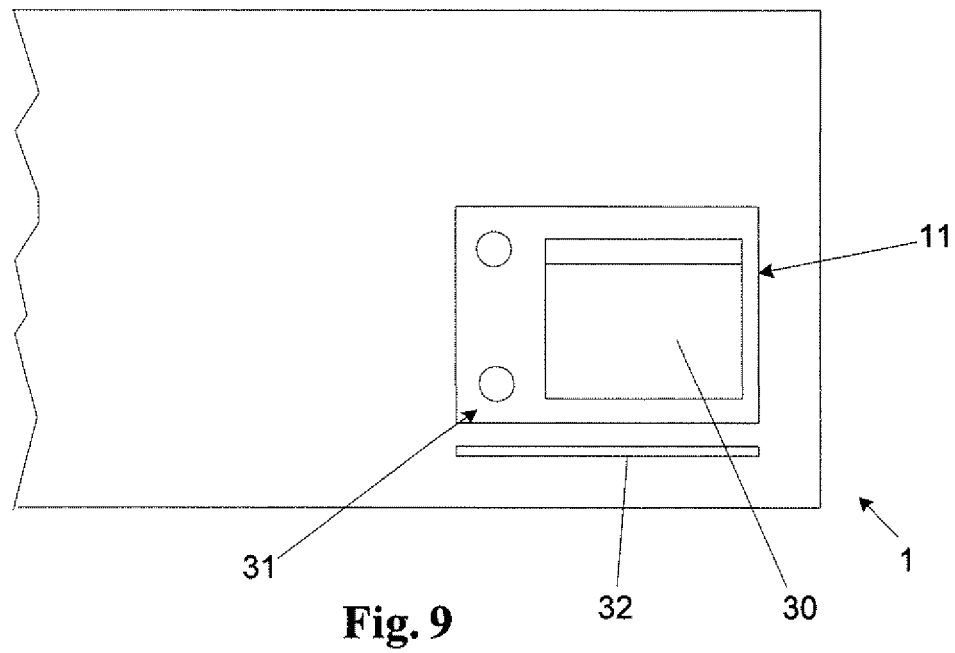
FIG. 9 shows an example of a detail of a printer including a user interface.

FIG. 9 shows an example of a portion of a printer 1. The printer 1 includes a user interface 11. The user interface 11 includes a display 30 and an operator panel 31. For example, the printer 1 includes a memory module reader 32, configured to verify and read the media authorization code 20 from a corresponding secured memory module 21 storing the media authorization code 20. The memory module reader 32 may be connected to the first authentication circuit 10 for authenticating the media authorization code 20.

Figure 10:
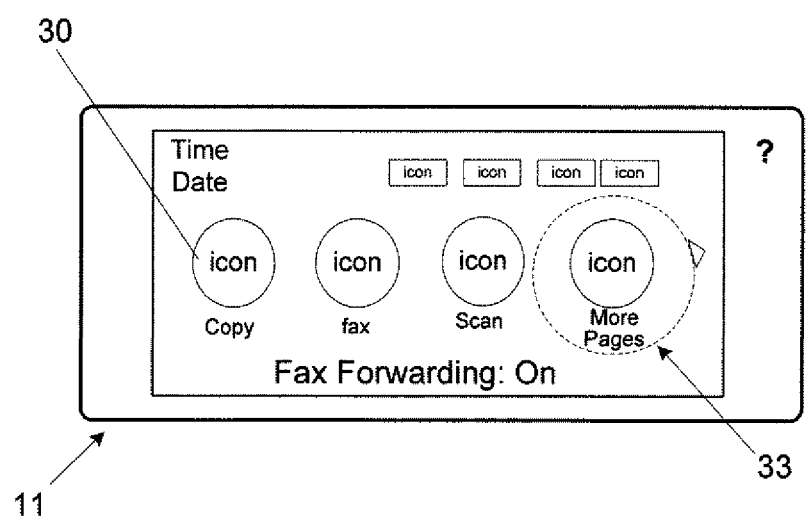
FIG. 10 shows an example of a user interface.

FIG. 10 shows an example of a user interface 11. The user interface 11 may be part of the printer or part of another device that is physically or wirelessly connected to the printer 1. The user interface 11 may be connected to the printer circuitry 2. The user interface 11 may be configured to activate at least one function of the printer 1, such as for example print, copy, fax, scan, etc. In an example, the user interface 11 is configured to transmit a request from a user to order more media units 5. For example the user interface 11 may be configured to provide an image of a button, icon 33 and/or text representing the order request. For example, said request is processed by the printer circuitry 2, wherein the printer circuitry 2 may trigger at least one a number of actions including forwarding the request to the authentication server 42, refreshing the display 30, asking the user to enter a code or number of media units 5, providing a description of at least one next step to take to complete or confirm the order/request, providing a phone number, etc.

Figure 11:
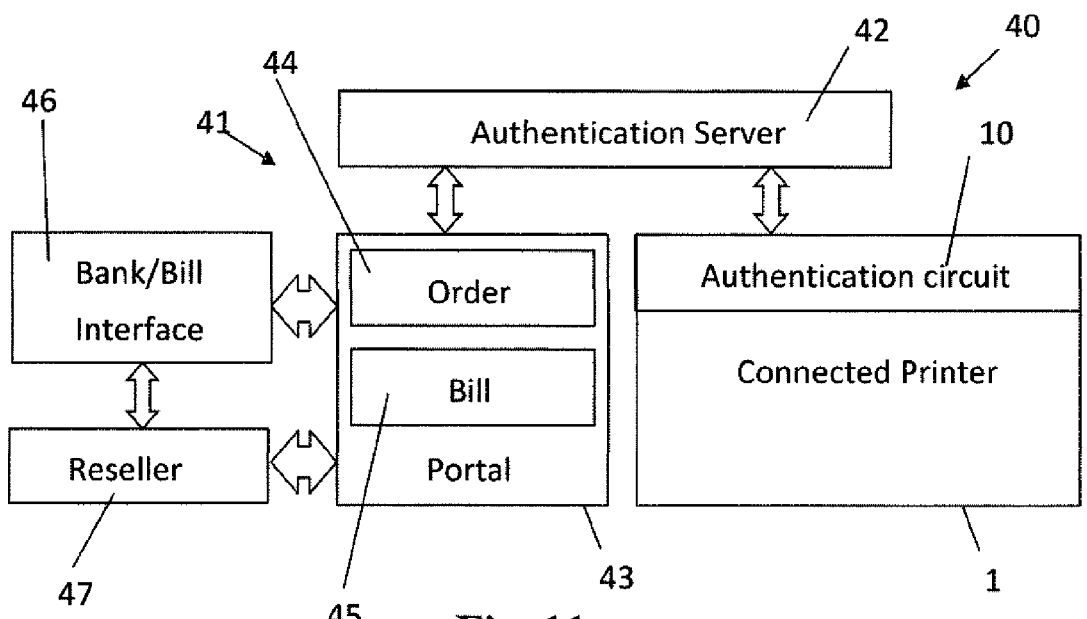
FIG. 11 shows a diagram of an example of a print system.

FIG. 11 is an example of a print system 40. The print system 40 includes a printer 1 that is connected to a data network such as a Local Area Network or internet or the like. The printer 1 includes a first authentication circuit 10 for authenticating a media authorization code 20. In a connected state, the printer 1 is connected, for example through said data network 41, to an authentication server 42. For example the authentication server 42 is arranged to receive a request from the printer 1, for example a request to authorize more media units 5. In order to order and authorize payment of certain amounts of media units 5, a portal 43 may be provided. For example, the portal 43 is managed by the reseller and/or manufacturer, or any authorized third party. For example, the portal 43 includes an order portal 44 to facilitate ordering of certain amounts of media units 5. For example, the portal 43 includes a billing portal 45 to facilitate billing, for example payment authorizations and transactions corresponding to the order amounts. The billing portal 45 may be configured to facilitate to a user to authorize a payment. The billing portal may be provided by any third party. In an example, the billing portal 45 may be configured to distribute the billed amount to different parties, for example between resellers 47, portal providers, manufacturers and/or other third parties. For example, a user may enter the portal 43 through a user interface 11 of any data network connected device, such as for example the printer 1, phone or any portable or desktop computing device. For example, the portal 43 may be configured to signal the ordered amount of media units 5 and corresponding transaction amount characteristics to the authentication server 42. For example, the portal 43 may be provided by a website, and/or a server, and/or another connected device. For example, the authentication server 42 is configured to authenticate the payment authorization, as received from the portal 43. For example, the authentication server 42 is configured to provide the media authorization code 20 to the authentication circuit 10 of the printer 1 for authorizing the ordered amount of media units 5.

Figure 12:
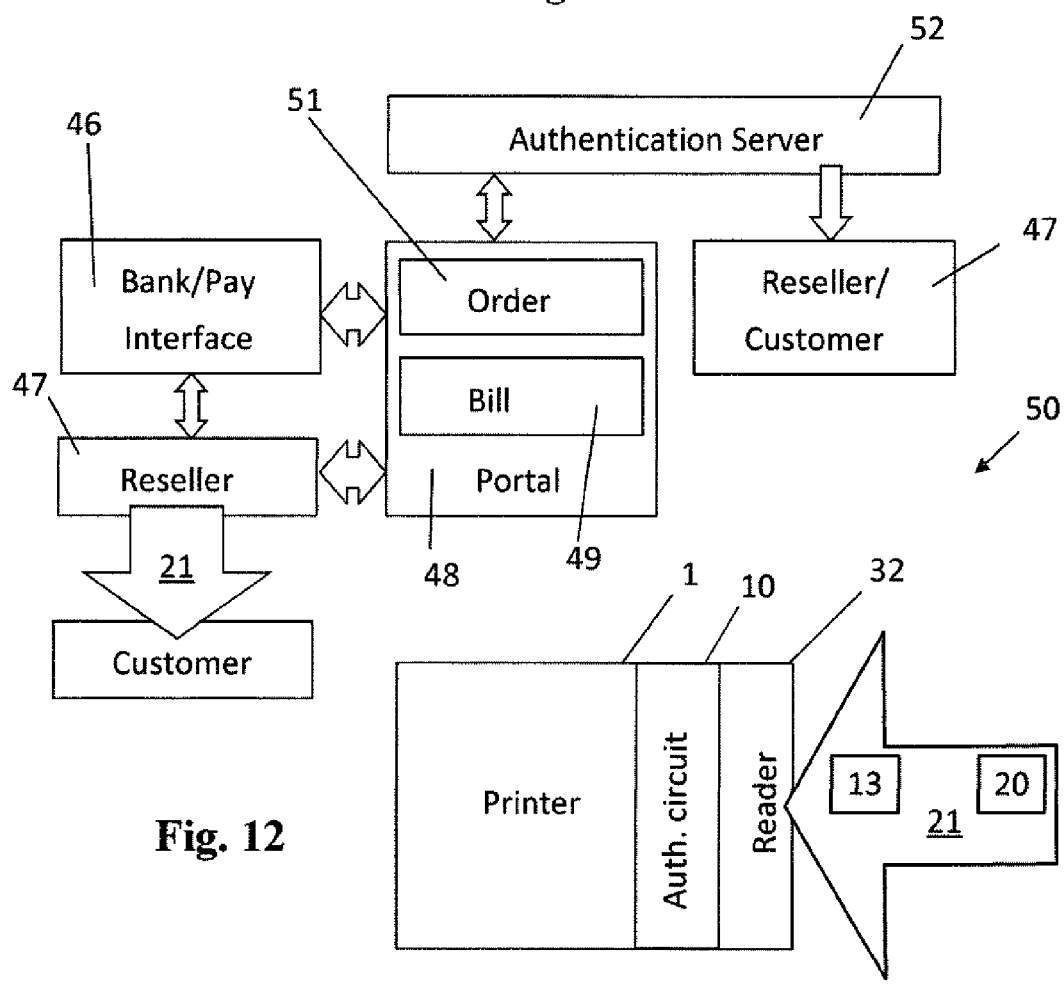
FIG. 12 shows a diagram of another example of a print system.

FIG. 12 shows another print system 50. The print system 50 includes a printer 1. The printer 1 includes the first authentication circuit 10 and the memory module reader 32 for receiving the media authorization code 20 from the memory module 21. For example, the memory module 21 includes a counter 13 for communicating how many authorized media units 5 are left on the memory module 21. For example, a microcontroller is configured to include the counter. For example, a reseller 47 or website of the reseller sells the memory module 21. A payment is realized or authorized through the reseller 47 or other third party, billing portal 49 and/or bank 46. For example, a portal 48 is provided. For example, the portal 48 is configured to interact with the reseller 47 or other third party. For example the portal 48 includes a billing portal 49 and an order portal 51 wherein the reseller 47 can order the amount of authorized media units 5. For example, the portal 48 may be configured to signal the ordered amount of media units 5 and corresponding transaction characteristics to the authentication server 42. For example, the authentication server 42 is configured to provide a second authorization code to the reseller 47 or third party or to the end user. For example, the second authorization code may be entered into the printer 1 together with the media authorization code 20.

Figure 13:
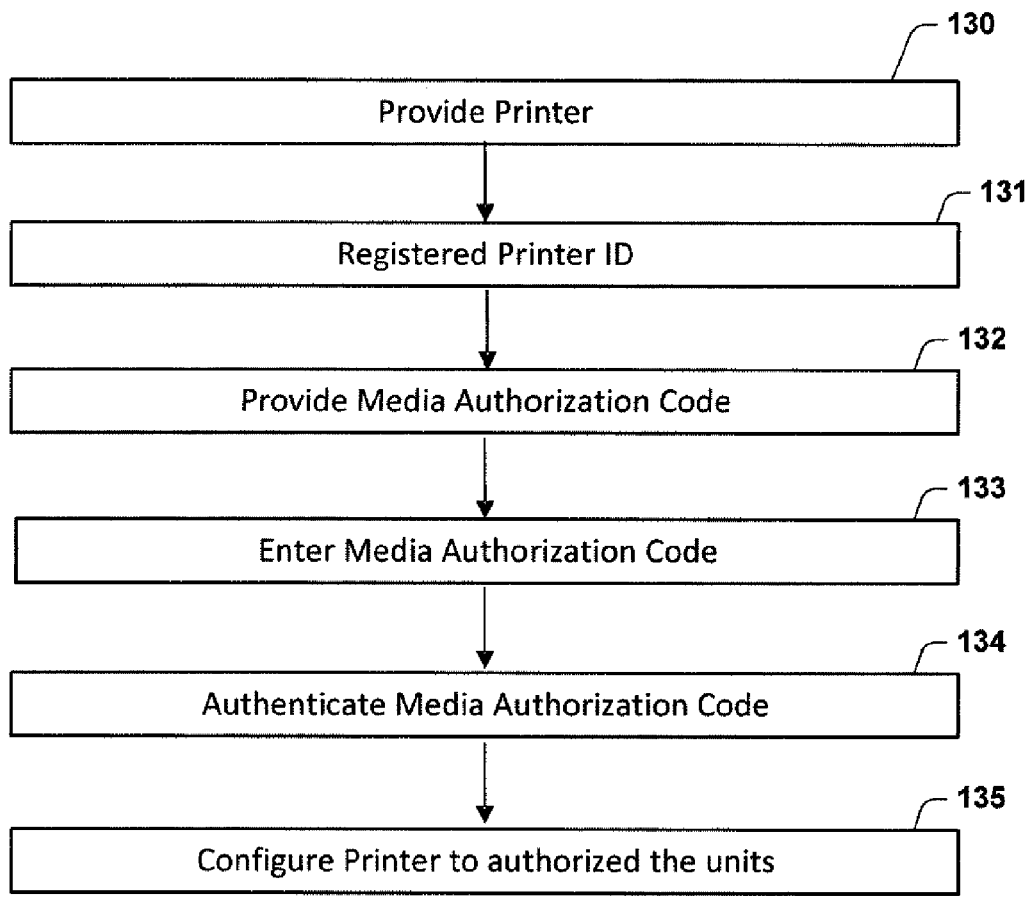
FIG. 13 shows a flow chart of an example of a method of facilitating printing.

FIG. 13 shows a flow chart of an example of a method of facilitating printing. The example method includes providing a printer 1 (block 130). For example, a reseller 147 provides the printer 1 to a customer who may be the end user or a company. The method may include registering an ID pertaining to the printer 1 (block 131). For example, the reseller 47 registers a number or code of the printer 1, and/or details of the customer. The example method includes providing a media authorization code 20 (block 132). For example, the reseller obtains the media authorization code 20 corresponding to the printer 1 and to a predetermined amount of media units 5 from a third party, such as a provider of the printer 1 and the media authorization code 20. The example method includes entering the obtained media authorization code (block 133), for example through the first authentication circuit 10 installed in the printer 1, for example through a data connection, memory module 21 and/or user interface 11. The example method includes authenticating the media authorization code 20 (block 134), for example through the first authentication circuit 10, so as to configure the printer 1 to authorize the predetermined amount of media units 5 (block 135).

Figure 14:
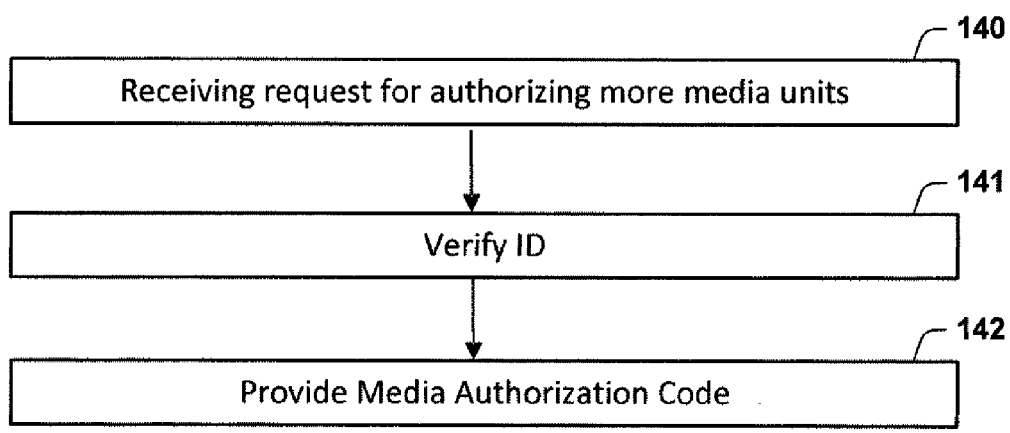
FIG. 14 shows a flow chart of an example of a method of authorizing printing.

A further example method of facilitating printing is indicated in FIG. 14 and may include receiving a request to authorize more media units for printing (block 140). For example, a reseller 47 or authentication server 42, 52 receives such request from a customer or end user who has ran out of authorized media units 5. The request may include an ID of the requesting party, for example corresponding to the customer or printer 1. The example method may include verifying the ID (block 141), for example with respect to a stored list or table (E.g. see FIG. 8). The example method may include facilitating the media authorization code 20 corresponding to a predetermined additional amount of authorized media units 5 (block 142), for example to the customer.

Figure 15:
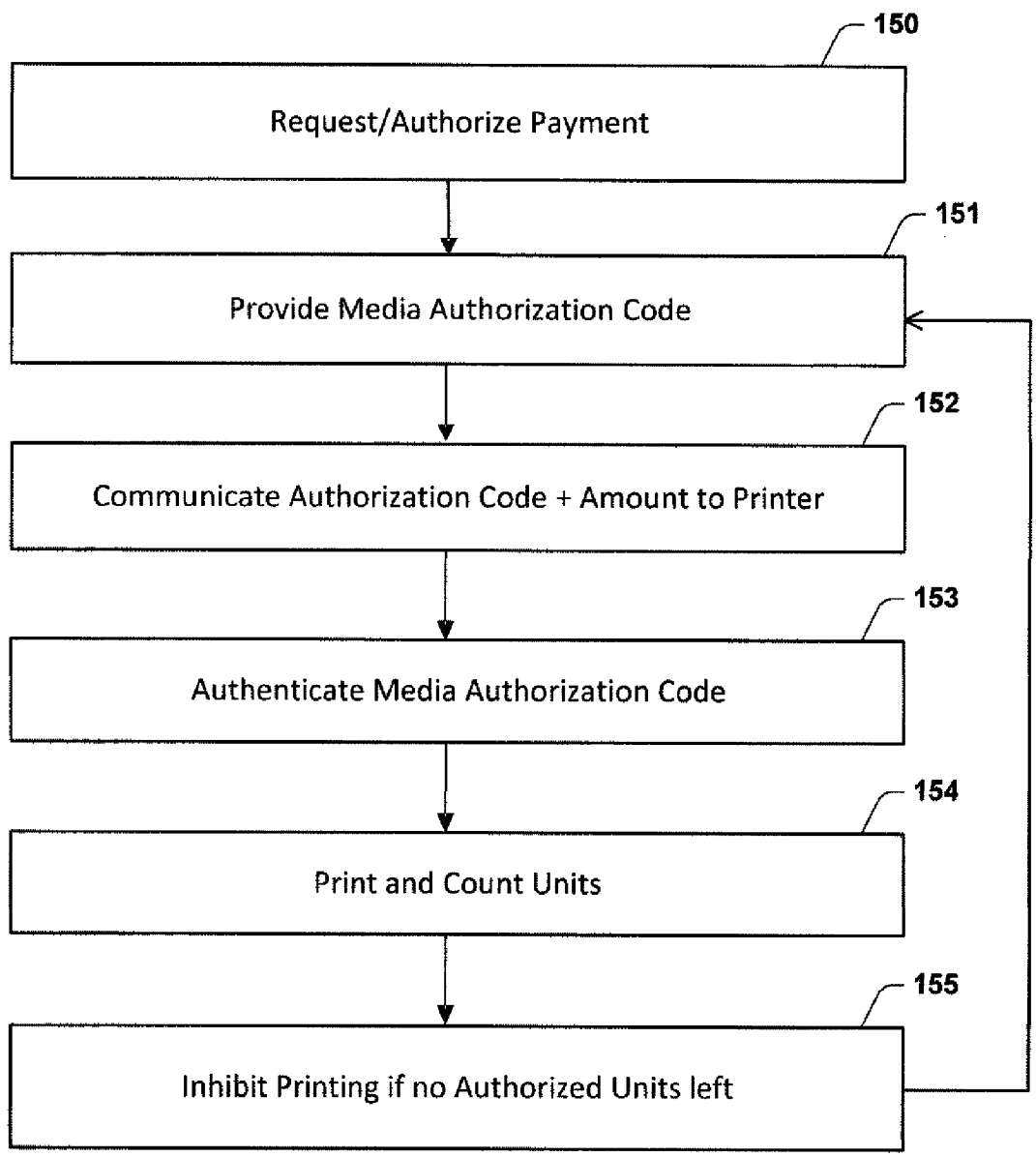
FIG. 15 shows a flow chart of an example of a method of printing.

FIG. 15 shows a flow chart of an example of a print method. The example print method includes requesting and/or authorizing payment for a print service (block 150). The example print method includes providing a media authorization code 20 (block 151). For example the media authorization code 20 is provided by an authentication server 42, 52, a reseller 47 and/or a memory module 21. The example print method includes communicating the media authorization code 20 and the amount of authorized media units 5 to the printer 1 (block 152), for example through the first authentication circuit 10 and/or the memory module reader 32. For example, the amount of authorized media units 5 is stored on the counter 13, for example on an internal memory 3 or an external device 12 such as the memory module 21 or the authentication server 42, 52. The example print method includes authenticating the media authorization code 20 (block 153), for example by the first authentication circuit 10. For example, authentication may be executed to decryption and comparing the decrypted code with a code in the printer memory 3 and/or a connected external device 12 and/or a second authorization code that may be provided through the user interface 11. The example method includes printing the media units 5, and counting the printed media units 5 (block 154). In the example print method, further printing is inhibited if the counter 13 exceeds the authorized amount of media units 5 (block 155).

Figure 16:
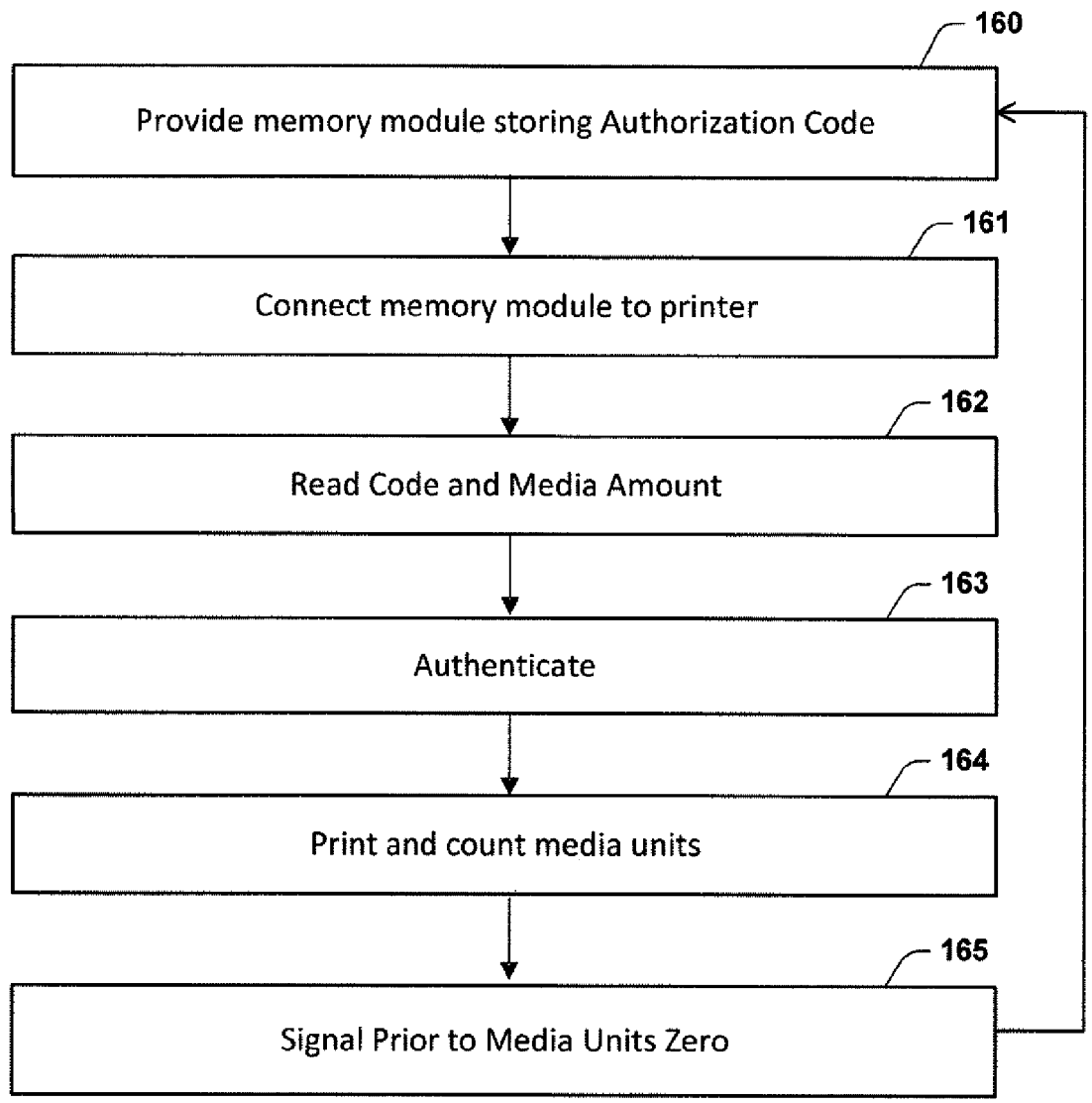
FIG. 16 shows a flow chart of another example of a method of printing.

FIG. 16 shows a flow chart of a further example of a print method. The example print method may include providing a memory module 21 storing the media authorization code 20 and the predetermined authorized amount of media units 5 (block 160). For example, a reseller 47 may sell the memory module 21 to a customer, for example through a website or in a store. The example print method may include connecting the memory module 21 to the printer 1 (block 161). For example, a chip on a smart card may be connected to a smart card reader. The example print method may include reading the media authorization code 20 and the authorized amount of media units 5 from the memory module 21 (block 162), for example by the first authentication circuit 10. The example print method may include authenticating the media authorization code (block 163). In an example the authentication process may include requesting a second authorization code such as a challenge code 22 that is provided on the memory module 21. The example print method includes printing the media units 5 (block 164) and counting the number of prints. For example, the authorized amount of media units 5 may be read from a counter 13 on the module 21, or the printer 1 may include a counter 13 wherein the count is compared with a predetermined stored amount on the module 21. The example print method may include signaling a user or customer that the amount of authorized media units 5 that is left is close to zero (block 165). For example, only 1000 or less, 100 or less, 50 or less or 10 or less authorized media units 5 are left to printed, as counted by the counter 13. In an example, the customer or reseller 47 may then request a new memory module 21. The new memory module 21 may be provided (block 160), as indicated by arrow 166.

Figure 17:
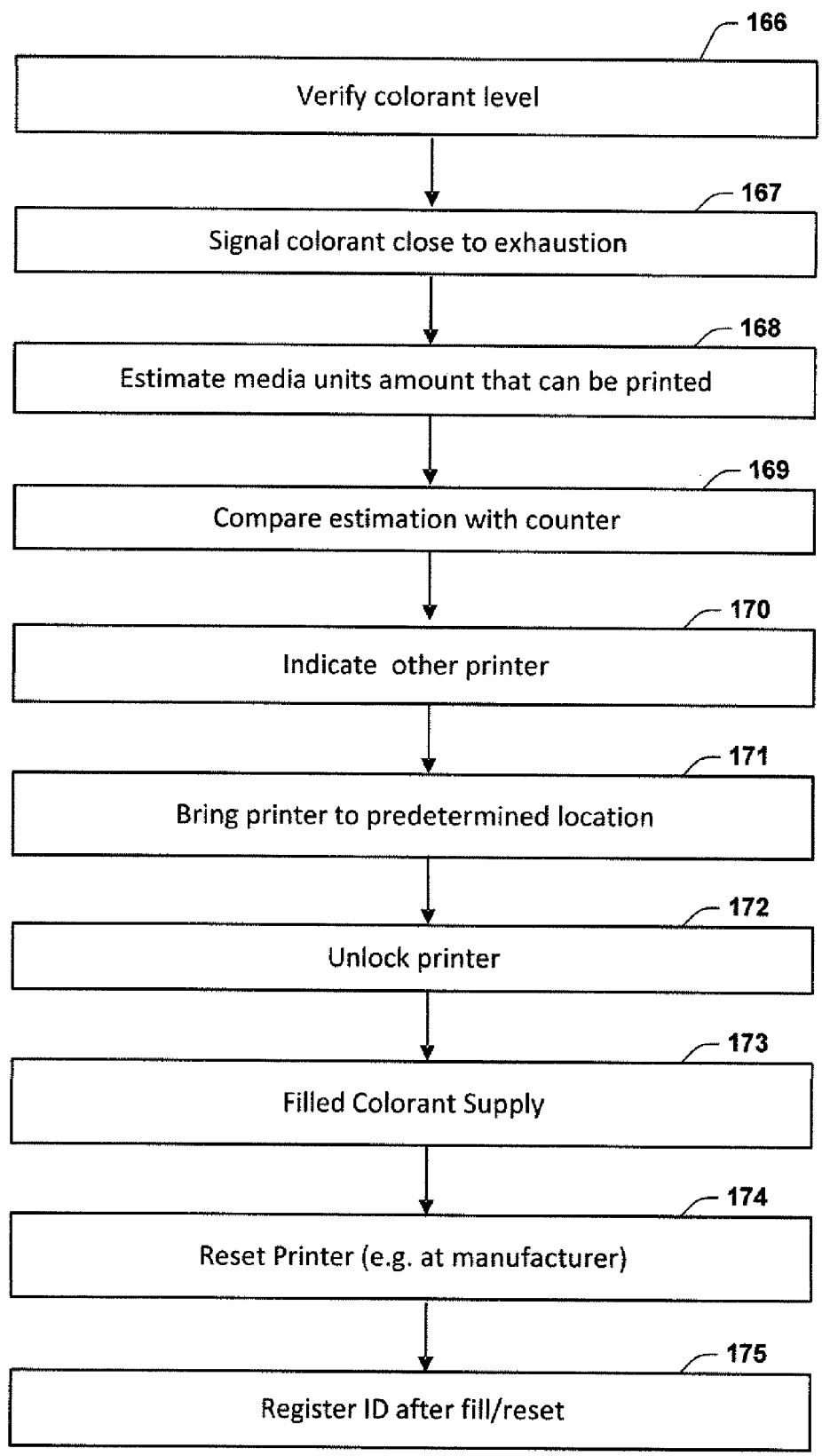
FIG. 17 shows a flow chart of an example of a method of printing.

FIG. 17 shows another flow chart of a further example of a print method, wherein the printer 1 is arranged to have a lifetime imaging supply. In an example scenario, a colorant in the printer 1 may be exhausted or almost exhausted as detected by the colorant sensing circuit 15 (block 166). For example, the printer 1 may signal that the colorant is close to exhaustion (block 167), for example through the user interface 11. The printer circuitry 2 may calculate and/or estimate how much media units 5 can be printed with the remaining colorant (block 168). For example the calculation may be based on an average level of colorant usage per media unit 5. The printer circuitry 2 may compare the estimated remaining amount of media units 5 based on colorant level with the remaining amount of authorized media units 5 on the respective counter 13 (block 169). In an example, the user interface 11 may indicate to the user to print a print job on another printer 1 (block 170), and/or to change printer 1.

The depleted or almost depleted printer 1 may be sent to, or picked up by, a predetermined location (block 171), such as for example a reseller 47, refiller, manufacturer, remanufacturer, service center, service partner, or any authorized third party. In an example, the printer 1 and/or colorant supply 4 may be mechanically and digitally unlocked for being able to refill or replace the colorant supply 4 (block 172). The printer 1 may be provided with a filled colorant supply 4 (block 173), for example by replacing the colorant supply 4 or refilling the colorant in the supply 4. In an example, the printer circuitry 2 may be at least partially reset (block 174), for example to so as to correspond to the filled colorant supply 4. An ID pertaining to the reset printer circuitry 2 and/or the filled colorant supply 4 may be registered (block 175), for future reference.

Figure 18:
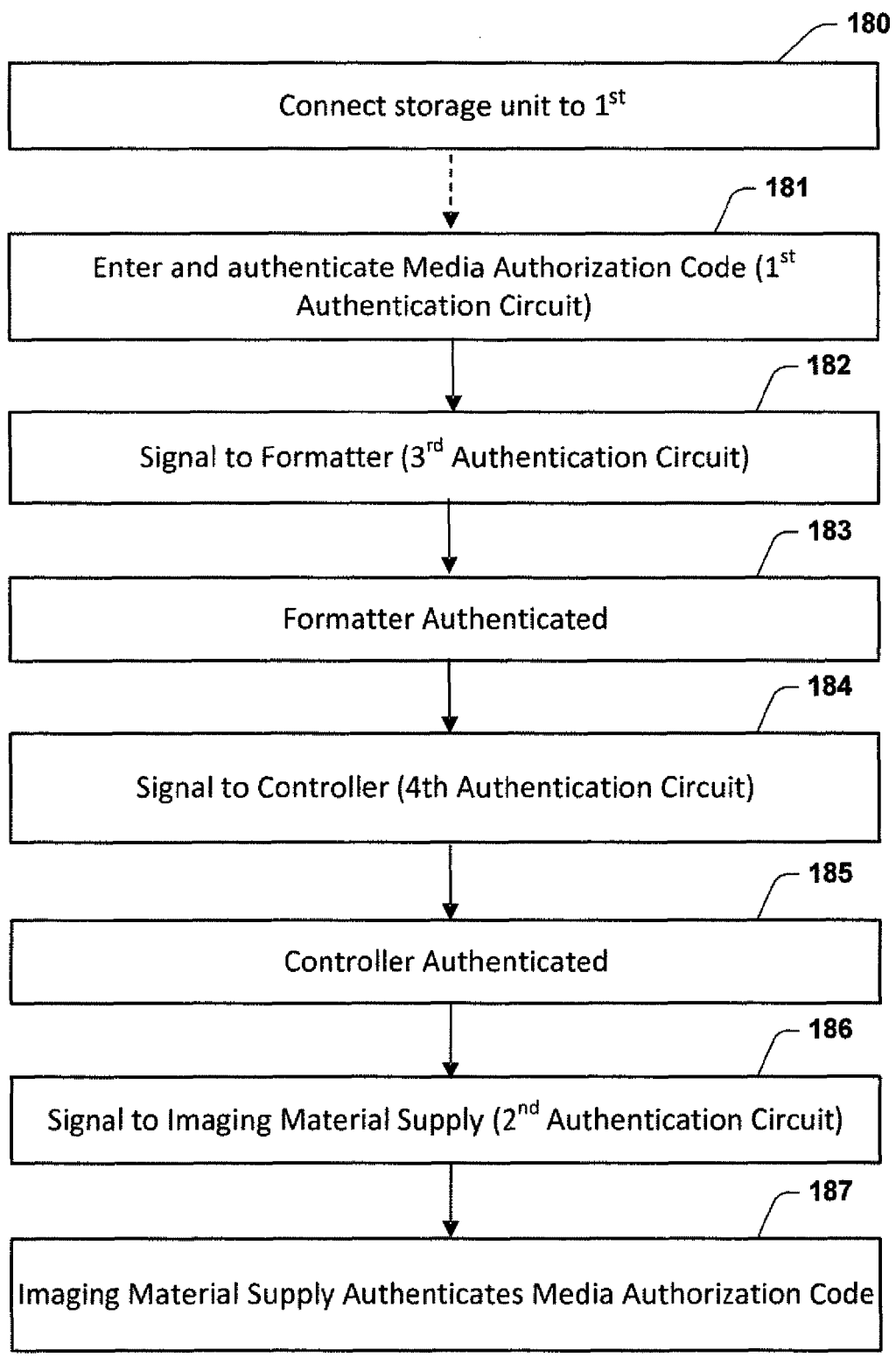
FIG. 18 shows a flow chart of an example of a method of authorizing printing.

FIG. 18 shows a flow chart of an example of a method of authorizing printing. For example an external device 12 such as an authentication server 42, 52 or a memory module 21 may be connected to the first authentication circuit 10, for example for retrieving the media authorization code 20 (block 180). The example method includes entering the media authorization code 20 (block 181) into the printer 1, for example through the first authentication circuit 10. For example, the first authentication circuit 10 authenticates the media authorization code 20 because a correspondence is established by the first authentication circuit 10. The printer circuitry 2 may signal the formatter 9 (block 182) for authentication. The formatter 9 may be provided with the third authentication circuit 16 for authenticating the formatter 9. In an example the printer circuitry 2, for example the first authentication circuit 10 or a separate authentication circuit 18, authenticates the third authentication circuit 16 so that the formatter 9 is authenticated (block 183). The printer circuitry 2 may signal the controller 8 (block 184) for authentication.

The controller 8 may be provided with the fourth authentication circuit 17 for authenticating the controller 8. In an example, the controller 8 is authenticated (block 185). In an example the printer circuitry 2, for example the first authentication circuit 10 or a separate authentication circuit 18, authenticates the fourth authentication circuit 17 for authenticating the controller 8. The printer circuitry 2 may signal the colorant supply 4 (block 186). The colorant supply 4 may be provided with the second authentication circuit 14 for authenticating the colorant supply 4. In an example, the colorant supply 4 is authenticated (block 187). In an example the printer circuitry 2, for example the first authentication circuit 10 or a separate authentication circuit 18, authenticates the second authentication circuit 14 for authenticating the colorant supply 4. In an example, the printer 1 is authorized to print only when the formatter 9, controller 8 and colorant supply 4 are authenticated by an authentication action as explained above.

In another example, authentication takes place by signaling the media authorization code 20 to at least one of the second, third and fourth authentication circuit 14, 16, 17, wherein each of the second, third and fourth authentication circuit 14, 16, 17 authenticates the media authorization code for authenticating at least one of the color supply 4, formatter 9 or controller 8, respectively.

Figure 19:
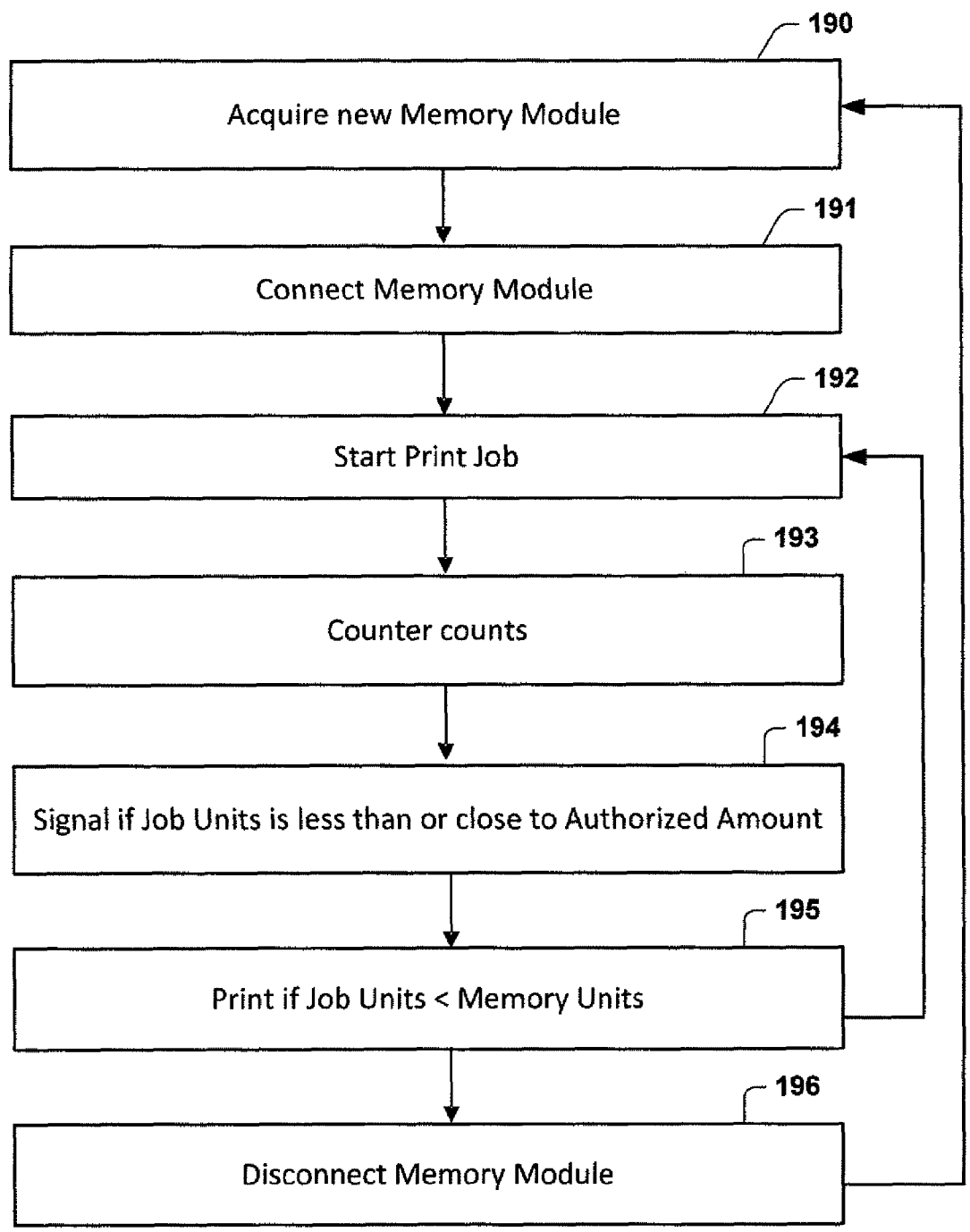
FIG. 19 shows a flow chart of another example of a method of printing.

FIG. 19 shows a flow chart of an example of a method of printing. For example a memory module 21 storing a media authorization code is acquired by a customer (block 190). For example, the memory module 21 is connected to the printer 1 (block 191) and the media authorization code is authenticated. In an example, the predetermined amount of authorized media units 5 is stored on a counter 13 of the memory module 21. In another example, the predetermined amount of authorized media units 5 is communicated to the internal memory 3 and/or an internal counter. The print job is started (block 192). The counter 13 counts (block 193). When a print job is received by the printer circuitry 2, the media units 5 needed for the print job are compared the remaining authorized media units 5 of the memory module. The user interface 11 signals a user if the remaining media units 5 of the memory module 21 are less than the media units 5 of the print job (block 194). The printer 1 is authorized to print if the remaining media units 5 of the memory module 21 are more than the media units 5 of the print job (block 195, 192). The memory module 21 may be disconnected (block 196) and a new one may be connected (block 190).

Figure 20:
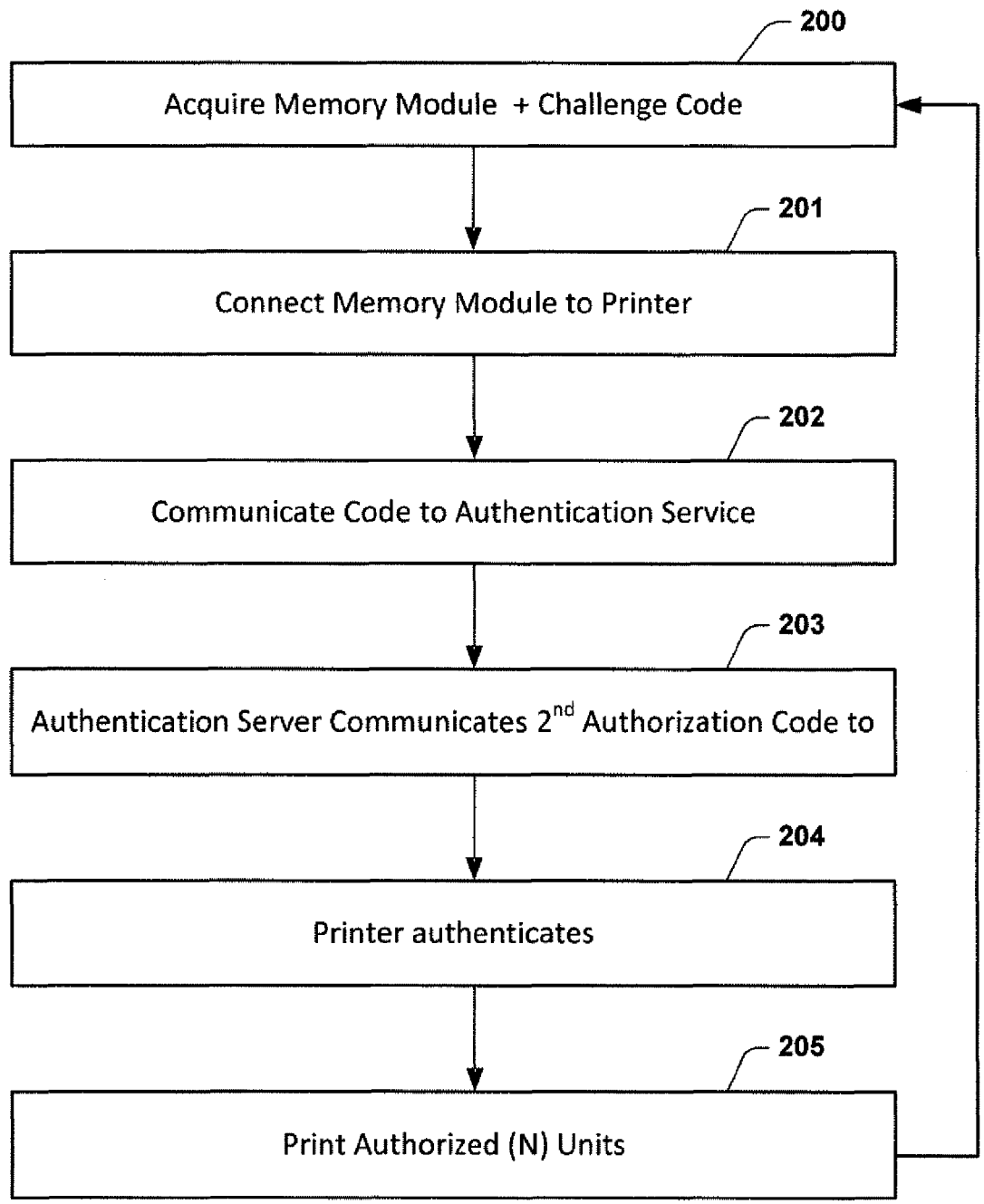
FIG. 20 shows a flow chart of an example of a method of printing.

FIG. 20 shows a flow chart of another example of a method of printing. For example, a memory module 21 is acquired. For example, the memory module 21 is provided with a digital media authorization code 20 and a human readable challenge code 22 (block 200), and a counter 13 that is set to a predetermined amount of authorized media units 5. The memory module 21 is connected to the printer 1 (block 201). The media authorization code 20 is read by the printer 1. The user communicates the challenge code 22 to an authentication server 42, 52, for example using a phone and/or user interface 11 (block 202). The authentication server 42, 52 communicates a second authorization code to the printer 1, through any suitable data communication network (block 203). The printer circuit 2 has then received both the media authorization code 20 and the second authorization code, so that the media authorization code can be authenticated and the printer 1 is authorized to print said authorized amount of media units 5 (block 204). Consequently, the authorized media units 5 may be printed until the memory module 21 is out of credits (block 205), and a new memory module 21 may be acquired (block 200).

Figure 21:
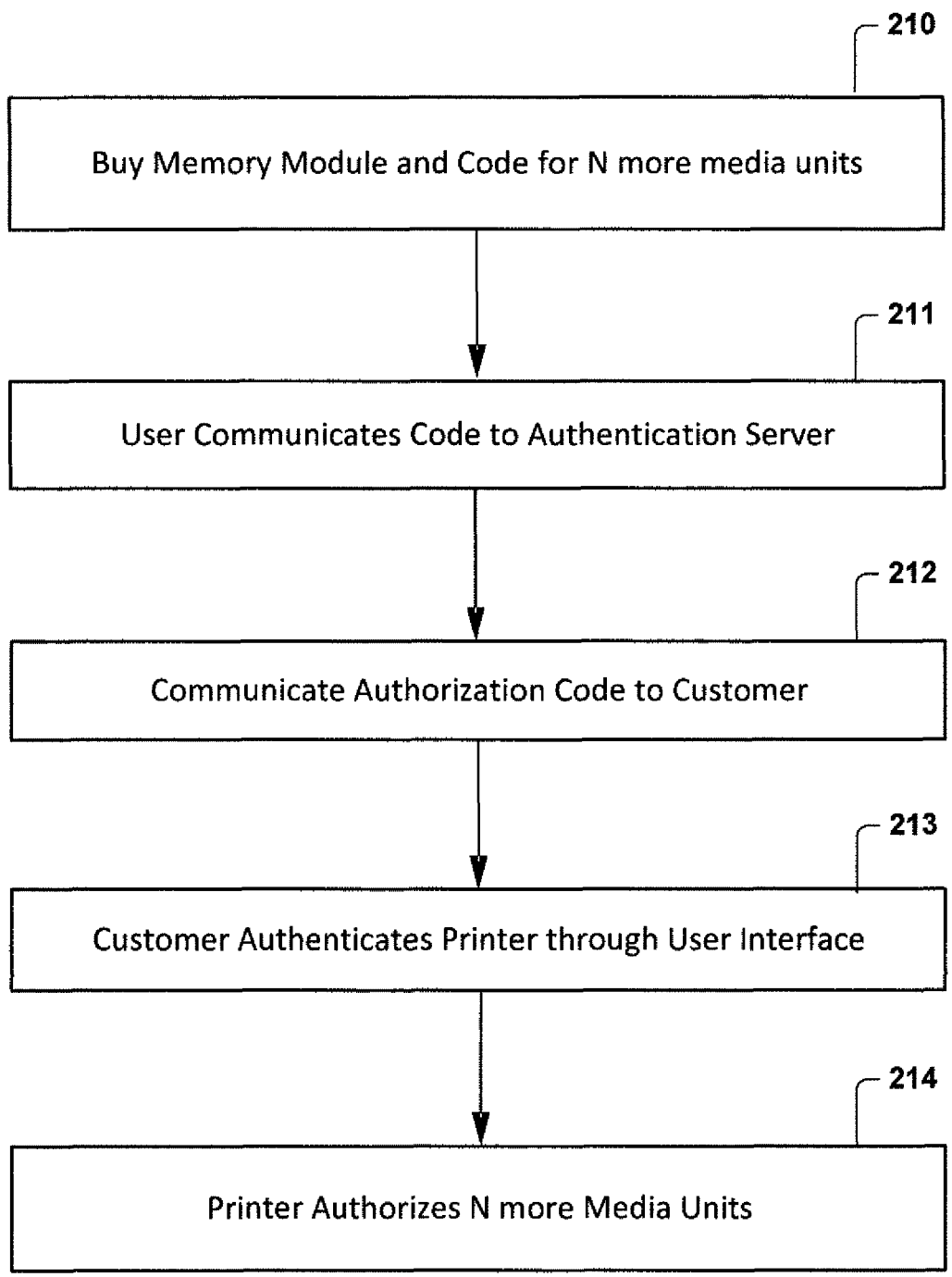
FIG. 21 shows a flow chart of another example of a method of authorizing printing.

FIG. 21 shows a flow chart of another example of a print method. For example, a memory module 21 is acquired (block 210). For example, the memory module 21 has a challenge code 22 stored on it, for example in human readable or digitally readable form so that it can be read by the user. The challenge code 22 corresponds to a media authorization code 20. For example, the challenge code 22 and corresponding media authorization code 20 correspond to a predetermined amount of authorized media units 5. For example, during the transaction, the user ID is be stored on a server 42, 52. In an example the user ID may correspond to his or her phone. The user communicates the challenge code 22 to an authentication service or authentication server 42, 52, for example using his or her phone and/or user interface 11 (block 211). For example, the user also provides his or her ID. The authentication service or server 42, 52, communicates the media authorization code 20 to the user (block 212). For example, the user enters the media authorization code 20 through the user interface 11. The media authorization code 20 is authenticated by the first authentication circuit 10 (block 213). For example the printer 1 authorized a predetermined number of authorized media units 5 (block 214), as indicated during the transaction.

Figure 22:
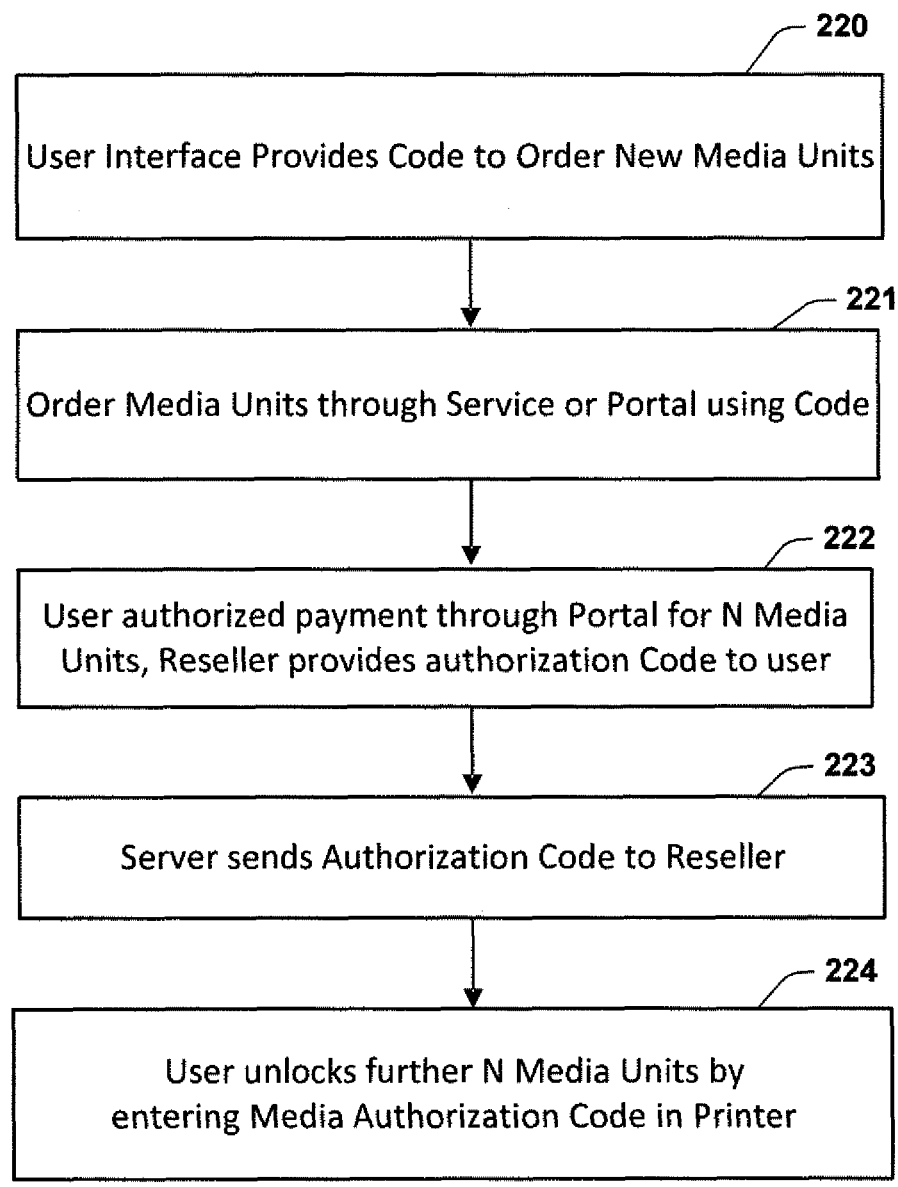
FIG. 22 shows a flow chart of another example of a method of authorizing printing.

FIG. 22 shows a flow chart of another example of a print method. For example, the user interface 11 indicates a challenge code 22 or message for ordering new media units 5 for printing, for example after a certain amount of authorized media units 5 have run out (block 220). In one example, the user communicates the challenge code 22, for example through a website or portal 48, for example through the user interface 11 (block 221). In another example, the user may confirm the message on the user interface 11 of the printer 1 for ordering more media units 5. Subsequently, a signal for example containing an ID and/or challenge code 22, is sent to the authentication server 42, 52. The authentication server 42, 52 receives and authenticates the signal, and sends the media authorization code 20 to the reseller 47 (block 222). Through said portal 48 the user may order the media units 5 and authorize payment (e.g. FIG. 12). In another example, the reseller 47 is paid directly, for example in cash or on location. After the payment or billing is confirmed by the reseller 47, the reseller 47 provides the media authorization code 20 to the user (block 223). The user enters the media authorization code in the printer 1, for example manually through the user interface 11. The printer 1 authenticates the media authorization code 20 and authorizes the ordered amount of media units 5 (block 224).

Figure 23:
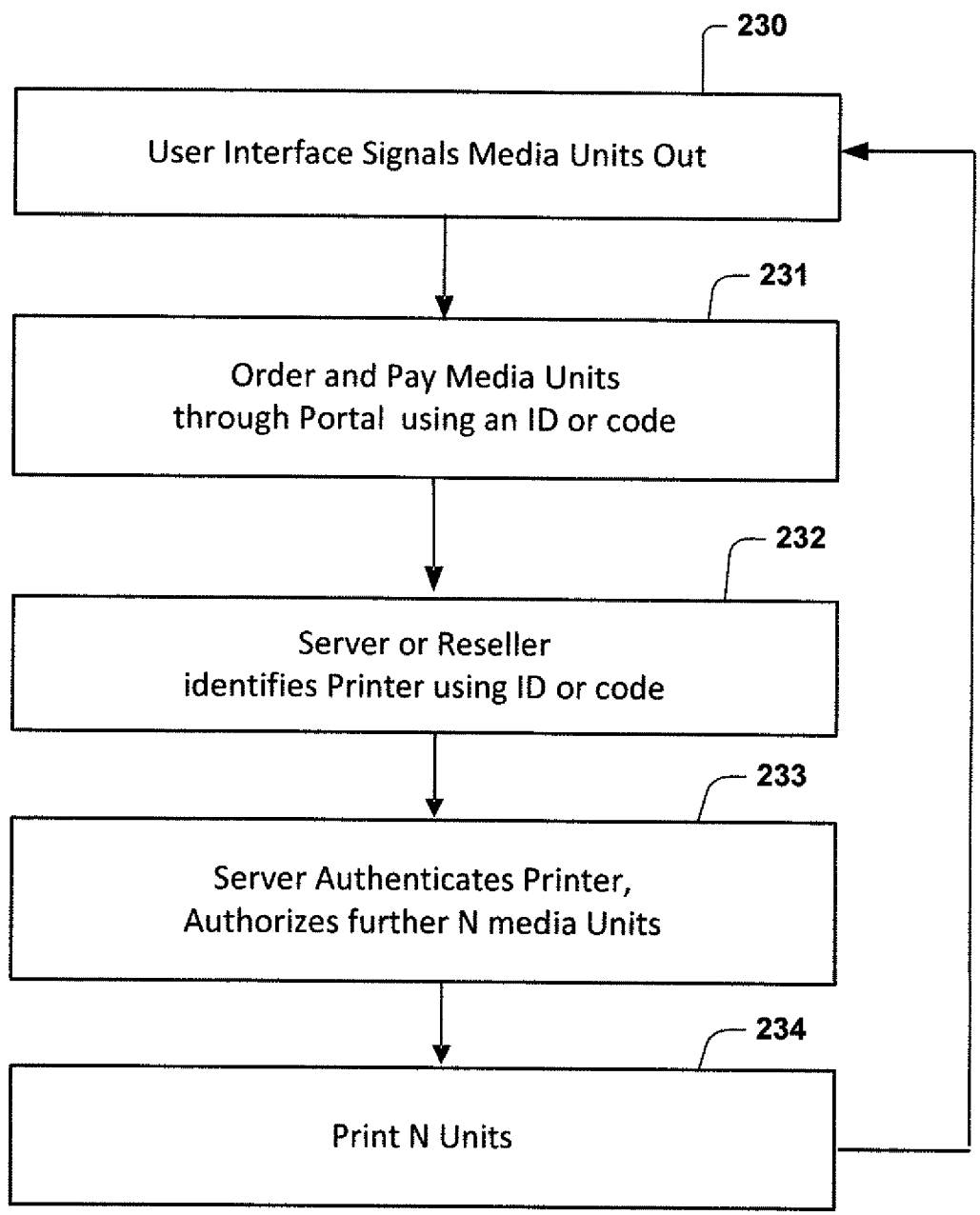
FIG. 23 shows a flow chart of another example of a method of authorizing printing.

FIG. 23 shows a flow chart of another example of a print method. For example, the user interface 11 signals that media units 5 have run out (block 230). The user may order and authorize payment for additional media units 5 through a portal 43. For example, the user may provide an ID when ordering the media units 5 (block 231). The media units 5 may have been registered when buying and/or registering the printer 1 at the reseller 47. The ID is communicated to, and identified by, the authentication server 42 and/or to the reseller 47 (block 232). Then, the authentication server 42 that is connected to the printer 1 through a data connection network, such as internet, sends the media authorization code 20 to the printer 1 so that the printer 1 is authenticated (block 233). The printer prints the authorized media units 5 (block 234).

Figure 24:
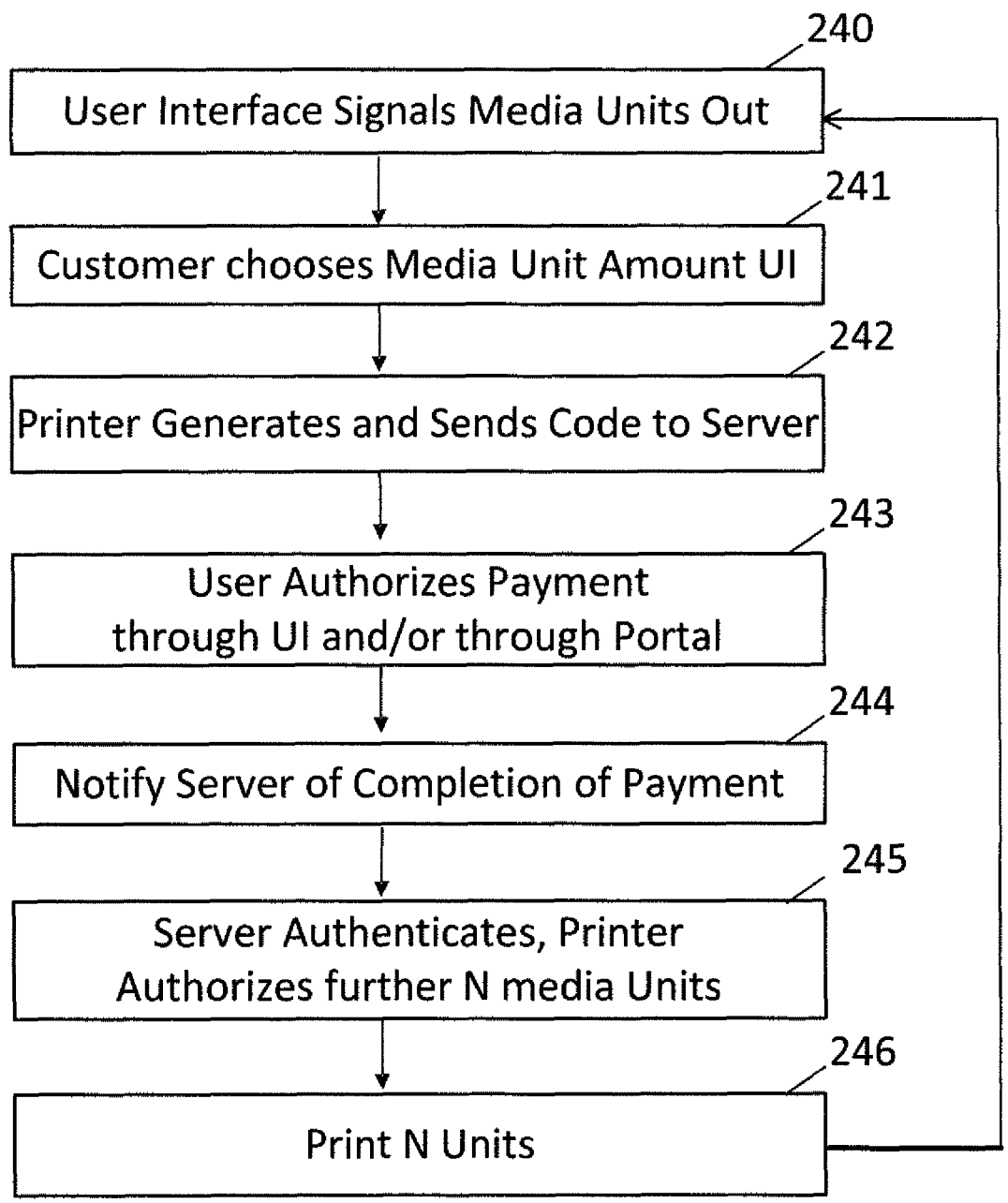
FIG. 24 shows a flow chart of another example of a method of authorizing printing and printing.

FIG. 24 shows a flow chart of another example of a print method. For example, the user interface 11 signals that the amount of authorized media units 5 is running out (block 240). The user interface 11 may indicate an option to order more media units 5. The user chooses an amount of authorized media units 5 through the user interface 11 (block 241). The printer circuitry 2 then generates a challenge code 22. The printer 1 sends the challenge code 22 to the authentication server 42 (block 242). The user then authorizes a corresponding payment through the portal 43, for example through the user interface 11 (block 243). When the payment authorization process is completed and/or confirmed a signal is sent, for example from a billing portal provider or server to the authentication server 42, to notify the authentication server 42 of the completed billing process (block 244). The authentication server 42 may send the media authorization code 20 to the printer 1. For example, the printer 1 authorized the media units 5 (block 245) and prints authorized media units 5 (block 246).

In certain examples, the authentication may take place at any stage and at different stages. For example, the internal components, including the colorant supply 4, the controller 8 and the formatter 9 may be authenticated at chosen or random stages. For example, the printer 1 may run the authentication checks when the media authorization code is entered and/or when may run internal authentication checks at other random or chosen moments.

In the above description, a resellers, customers, users, or manufacturers were referred to for illustration purposes but may in fact be any party or third party. The above description is not intended to be exhaustive or to limit this disclosure to the examples disclosed. Other variations to the disclosed examples can be understood and effected by those skilled in the art from a study of the drawings, the disclosure, and the claims. The indefinite article "a" or "an" does not exclude a plurality, while a reference to a certain number of elements does not exclude the possibility of having more or less elements. A single unit may fulfil the functions of several items recited in the disclosure, and vice versa several items may fulfil the function of one unit. Multiple alternatives, equivalents, variations and combinations may be made without departing from the scope of this disclosure.

The invention claimed is:
1. Printer, comprising
    a memory,
    a colorant supply that includes an extended supply of colorant, arranged to transfer colorant to media, wherein the colorant supply is integrated with the printer so as to be non-exchangeable and non-refillable from an end user perspective, and
    printer circuitry comprising
        a first authentication circuit to authenticate the colorant supply and verify that a colorant supply identifier (ID) associated with the colorant supply corresponds to a printer ID of the printer,
        a second authentication circuit to authenticate an entered media authorization code,
        a memory module to digitally and securely store the media authorization code, and
        a human readable code to facilitate verification of the media authorization code,
        a controller to instruct the colorant supply to transfer the colorant according to processed digital images,
        a formatter to process digital images and instruct the controller,
        a third authentication circuit to verify if the formatter and the printer correspond, and
        a fourth authentication circuit to verify if a controller and printer correspond,
    the printer circuitry further to
    upon authentication, instruct a counter to count printed media units, authorize the colorant supply to print as long as the counter does not exceed a predetermined amount of authorized media units, and inhibit the colorant supply to print when at least one of the colorant supply and the printer does not correspond, and the counter exceeds the predetermined amount of authorized media units.

2. Printer according to claim 1, wherein
the colorant supply is a lifetime colorant supply arranged to be reused.

3. Printer according to claim 1, comprising
a memory module reader to verify and read the media authorization code from the memory module storing the media authorization code, and the second authentication circuit being connected to the memory module reader.

4. Print system, comprising
a printer according to claim 1, and
an authentication server, storing at least the printer ID, to receive a media authorization code request, and
forward a media authorization code corresponding to the respective ID to the printer corresponding to the respective ID.

5. Method of facilitating printing, comprising
providing a printer having a colorant supply with sufficient colorant to print, wherein the printer is locked for printing from an end user perspective,
registering a printer identifier (ID) pertaining to the printer,
obtaining from a third party a media authorization code corresponding to the printer and to a predetermined amount of media units based on the printer ID,
entering the media authorization code into the printer,
the printer authenticating the media authorization code,
determining whether the predetermined amount of media units for printing does not exceed an estimated number of remaining media units that can be printed with the colorant supply,
configuring the printer to authorize the predetermined amount of media units for printing based on the determination,
requesting a challenge ID in response to authenticating the media authorization code,
entering the challenge ID,
verifying that each of the media authorization code, the printer ID, and the challenge ID correspond to the other, and
configuring the colorant supply to print the predetermined amount of media units in response to the verification.

6. Method of facilitating printing according to claim 5, comprising
receiving a request to authorize more media units for printing, the request including the printer ID and a further predetermined amount of media units,
verifying the printer ID, and
facilitating the media authorization code corresponding to the further predetermined amount of media units.

7. Print method, comprising,
registering a printer identifier (ID) pertaining to the printer,
requesting a authorization of a predetermined amount of media units for printing,
communicating a media authorization code and the predetermined amount of media units to a printer,
the printer authenticating the media authorization code by a first authentication circuit,
authenticating a colorant supply by a second authentication circuit,
requesting a challenge identifier (ID) in response to authenticating the media authorization code,
entering the challenge ID,
verifying that each of the media authorization code, the printer ID, and the challenge ID correspond to the other,
configuring the colorant supply to print the predetermined amount of media units in response to the verification,
printing media units,
counting the printed media units, and
inhibiting the colorant supply from further printing when the counting exceeds the predetermined amount of media units or if the media authorization code and/or the colorant supply are not authenticated.

8. Print method according to claim 7, comprising
providing a microcontroller storing the media authorization code and the predetermined amount of media units,
communicating the media authorization code and predetermined amount of media units by connecting the microcontroller to the printer,
authenticating the media authorization code, and
authorizing the predetermined amount of media units from the microcontroller.

9. Print method according to claim 7, wherein the colorant supply is a lifetime colorant supply comprising, within the printer,
authenticating the media authorization code, and at least one of
authenticating a formatter,
authenticating a controller, and
authenticating the colorant supply.

10. Print method according to claim 7, comprising, when at least one colorant of the colorant supply is substantially exhausted or almost exhausted,
sending the printer to a predetermined location,
unlocking the colorant supply at the predetermined location,
providing the printer with a filled colorant supply,
resetting circuitry of the printer, and
registering IDs of the printer and/or the filled colorant supply, and
recirculating the printer for usage.

11. Print method according to claim 7, comprising
verifying a remaining colorant level, and
assigning an amount of remaining authorized media units to another printer if it is estimated that the amount of remaining authorized media units cannot be printed with the remaining colorant level.

12. Printer according to claim 1, wherein the printer circuitry is further to authenticate the colorant supply by verifying if a level of colorant in the colorant supply approximately matches an expected level of colorant.

13. Printer according to claim 12, wherein if the level of colorant in the colorant supply does not approximately match the expected level of colorant, the printer circuitry is further to inhibit the colorant supply from printing.

14. Printer according to claim 1, wherein the printer circuitry is to authenticate the media authorization code at one or more randomly selected times after the media authorization code has been entered.

15. Print method according to claim 11, wherein the estimated number of remaining media units that can be printed with the colorant supply is determined based on an average level of colorant usage per media unit.

* * * * *